(12) United States Patent
Sakai et al.

(10) Patent No.: US 6,602,615 B2
(45) Date of Patent: Aug. 5, 2003

(54) COMPOSITE SLIDING MATERIAL

(75) Inventors: Kenji Sakai, Nagoya (JP); Eisaku Inoue, Nagoya (JP); Satoru Kurimoto, Nagoya (JP); Koichi Yamamoto, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/103,764

(22) Filed: Mar. 25, 2002

(65) Prior Publication Data

US 2003/0008169 A1 Jan. 9, 2003

(30) Foreign Application Priority Data

Mar. 23, 2001 (JP) ......................................... 2001-084916

(51) Int. Cl.[7] ............................................... B32B 15/20
(52) U.S. Cl. .................... 428/676; 428/677; 428/908.8; 428/926
(58) Field of Search ................. 428/676, 677, 428/908.8, 926

(56) References Cited

U.S. PATENT DOCUMENTS 5,286,444 A 2/1994 Tomikawa et al.
5,429,876 A 7/1995 Tanaka et al.

FOREIGN PATENT DOCUMENTS

| GB | 2 272 029 | 5/1994 |
| GB | 2 355 016 | 4/2001 |
| GB | 2 359 822 | 9/2001 |
| JP | 2001 234265 | 8/2001 |

*Primary Examiner*—Robert R. Koehler
(74) *Attorney, Agent, or Firm*—Browdy and Neimark, P.L.L.C.

(57) ABSTRACT

Disclosed is a composite sliding material having a steel plate and a sintered copper alloy layer which is bonded to the steel plate. The copper alloy contains, 1.5 to 15 mass % Sn, 1.5 to 15 mass % Bi, 1.5 to 20 volume % of a solid lubricant, and balance of Cu and incidental impurities. The volume ratio of Bi to the solid lubricant is in a range of 0.5 to 2.0. Bi and the solid lubricant improves the copper alloy in sintering property, since Bi melts when sintering because of a low melting point resulting in improved sintering property, and the solid lubricant ensures good anti-seizure property, and deterioration of mechanical strength is prevented by virtue of a phenomenon that the solid lubricant is entrained in Bi.

20 Claims, 1 Drawing Sheet

COMPOSITE SLIDING MATERIAL

BACKGROUND OF THE INVENTION

1. Field of the Invention

The present invention relates to a composite sliding material suitable for bearing materials used in automobiles, agricultural machines, industrial machines and so on.

2. Brief Description of the Art

Composite sliding materials, in which a sintered copper alloy is bonded on a steel plate, have been hitherto used for bearings, bushings, washers, etc. in the fields of automobiles, agricultural machines, industrial machines and so on. The sintered copper alloy is typically a Cu—Sn—Pb (lead bronze) alloy, which exhibits good sliding properties because the Cu alloy matrix supports a load and Pb improves anti-seizure property with a mating member.

The sintered copper alloy has improved anti-seizure property by virtue of additive Pb in bronze. However, it is preferable not to use Pb as far as possible since Pb adversely affects the environment. Thus, Bi is a possible alternative to Pb, but with regard to the anti-seizure property it is not expectable for Bi to have generally the same level effect. There is also a material which is of bronze containing graphite (a solid lubricant). However, it is inferior in mechanical properties because of lack of Pb as a low melting-point metal to be a liquid phase when sintering.

The present invention has been accomplished in view of the above background.

An object of the invention is to provide a copper system composite sliding material without Pb having excellent sliding properties equal to or superior to those of the lead-bronze system sintered copper alloy while having excellent mechanical strength.

SUMMARY OF THE INVENTION

The present inventors have found that, in the case where Bi and a solid lubricant are added into bronze, since Bi melts when sintering because Bi has a melting point as low as Pb, sintering property is improved and good anti-seizure property by virtue of the solid lubricant can be obtained, and that the coexisting solid lubricant and Bi prevent deterioration of mechanical strength of the bronze containing the solid lubricant and Bi, whereby the present invention has been achieved.

According to one aspect of the invention, there is provided a composite sliding material comprising a steel plate and a sintered copper alloy layer which is bonded to the steel plate, wherein the copper alloy comprises 1.5 to 15 mass % of Sn, 1.5 to 15 mass % of Bi, 1.5 to 20 volume % of a solid lubricant, and balance of Cu and incidental impurities, and wherein a volume ratio of Bi to the solid lubricant is in a range of 0.5 to 2.0.

According to another aspect of the invention, there is provided a composite sliding material comprising a steel plate and a sintered copper alloy layer which is bonded to the steel plate, wherein the copper alloy comprises 1.5 to 15 mass % of Sn, 0.03 to 1 mass % of P, 1.5 to 15 mass % of Bi, 1.5 to 20 volume % of a solid lubricant, and balance of Cu and incidental impurities, and wherein a volume ratio of Bi to the solid lubricant is in a range of 0.5 to 2.0.

Herein below, there will be provided reasons why the above components are contained in the copper alloy of the invention composite sliding material in the specific quantities, respectively.

(1) Sn: 1.5 to 15 Mass %

Sn strengthens the Cu matrix of the invention copper alloy. When the Sn amount is less than 1.5 mass %, the effect of strengthening the Cu matrix can not be obtained. When it exceeds 15 mass %, the Cu matrix becomes brittle because of much formation of a Cu—Sn compound.

(2) Bi: 1.5 to 15 Mass %

Bi becomes liquid when sintering and improves sintering property of the copper alloy. Further, Bi improves anti-seizure property and wear resistance of the copper alloy in an oil lubricating region, and also improves machinability together with the coexisting solid lubricant. When the Bi content is less than 1.5 mass %, the effects on anti-seizure property and wear resistance of the copper alloy can not be attained, and machinability of the copper alloy is deteriorated due to lack of an enough coexistence of Bi and the solid lubricant. When the Bi content exceeds 15 mass %, the copper alloy is deteriorated in strength.

(3) Solid Lubricant: 1.5 to 20 Volume %

The solid lubricant improves anti-seizure property and wear resistance of the copper alloy in the boundary lubrication state or the non-lubrication state. When the content of the solid lubricant is less than 1.5 volume %, the effects of improving anti-seizure property and wear resistance of the copper alloy can not be observed. When the content of the solid lubricant exceeds 20 volume %, the copper alloy is deteriorated in strength and machinability.

(4) Volume Ratio of Bi to a Solid Lubricant: 0.5 to 2.0

When the volume ratio of Bi to a solid lubricant (volume of Bi/volume of the solid lubricant) is in a range of 0.5 to 2.0, Bi and the solid lubricant coexist such that the solid lubricant is entrained in Bi, as shown FIG. 1. Thus the solid lubricant hardly leaves from the metal structure resulting in improved anti-seizure property and wear resistance. The most preferable volume ratio for coexistence of Bi with the solid lubricant is approximately 1. When the volume ratio of Bi to the solid lubricant is less than 0.5, the Bi effect is decreased, which is of restraining deterioration of the tensile strength of the copper alloy caused by the solid lubricant. When the ratio exceeds 2.0, the effect of the solid lubricant on anti-seizure property is deteriorated.

The solid lubricant may be one or more substances selected from the group consisting of graphite, BN, $MoS_2$ and $WS_2$. It may be of course any solid lubricant other than the above substances.

(5) P: 0.03 to 1 Mass %

P (phosphorous) improves the strength of the Cu matrix. When the P content is less than 0.03 mass %, it is impossible to improve the strength of the Cu matrix. When the P content exceeds 1 mass %, the Cu matrix becomes brittle.

According to one feature of the invention composite sliding material, the copper alloy further comprises not more than 40 mass % in total of one or more elements selected from the group consisting of Fe, Al, Zn, Mn, Co, Ni and Si. These elements dissolve in the Cu matrix to strengthen the Cu matrix. When the content of the element(s) exceeds 40 mass % in total, the hardness of the Cu matrix becomes too high resulting in deterioration of conformability.

According to another feature of the invention composite sliding material, a copper plating layer, having a thickness of not less than 2 $\mu$m, exists between the steel plate and the sintered copper alloy layer. The copper plating layer improves the bonding strength between the sintered copper alloy layer and the steel plate. When the thickness is less than 2 $\mu$m, such effect can not be obtained.

According to still another feature of the invention composite sliding material, the sintered copper alloy has a tensile strength of not less than 200 N/mm² thereby restraining deterioration of fatigue resistance thereof.

DESCRIPTION OF EMBODIMENTS

Figure 1:
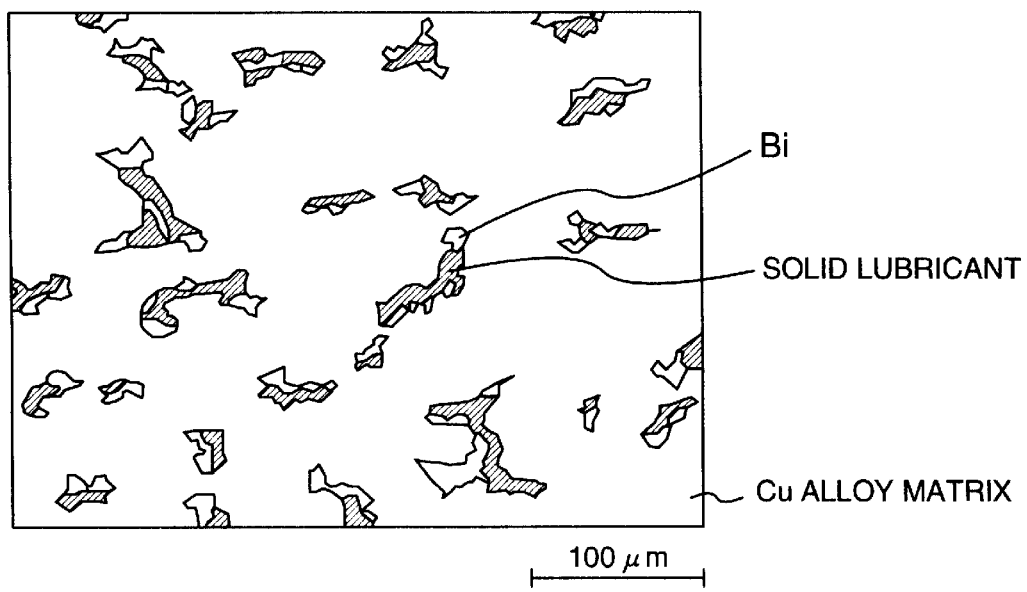
FIG. 1 is a sectional view schematically showing the metal structure of embodiments of the invention sintered copper alloy.

Now, there will be described embodiments of the present invention.

First, mixed powders for sintering were prepared, respectively, by mixing a Cu—Sn system copper alloy powder, a Bi powder and a solid lubricant powder (graphite for the specimens other than Invention Example 8, and BN for Invention Example 8) in a mixer for about 1 hour for respective Embodiment Examples and Comparative Examples (except Invention Examples 2 and 10 and Comparative Examples 6 and 7) so that the compositions shown in Table 1 were attained.

With regard to Invention Example 2, a mixed powder for sintering was prepared by mixing a Cu—Sn—P system copper alloy powder, a Bi powder and a solid lubricant powder in a mixer for about 1 hour.

With regard to Invention Example 10, a mixed powder for sintering was prepared by mixing a Cu—Sn—Co system copper alloy powder, a Bi powder and a solid lubricant powder in a mixer for about 1 hour as stated above.

With regard to Comparative Example 6, a mixed powder for sintering was prepared so as to have substantially the same chemical composition as Invention Example 1 except for a Pb powder alternative to the Bi powder, in which the volume of the Pb powder was the same as that of the Bi powder in Invention Example 1.

With regard to Comparative Example 7, a mixed powder for sintering was prepared by mixing a Cu—Sn system copper alloy powder and a Pb powder in a mixer for about 1 hour without using a Bi powder and a solid lubricant powder.

A combination of the Cu—Sn system copper alloy powder and the Bi powder mentioned above may be replaced by a Cu—Sn—Bi alloy powder.

The thus prepared mixed powders for sintering, except for Invention Example 2, respectively, was uniformly spread on a steel plate having a thickness of 1.3 mm, and heated to 750 to 900° C. in a reduction atmosphere to conduct a first sintering treatment. Thereafter, the prepared entirety was subjected to rolling followed by second sintering under the same conditions as the first sintering. Subsequently, the intermediate product was again subjected to rolling (final rolling) to obtain a composite sliding material as a bimetal. It should be noted that Invention Example 9 was not subjected to the final rolling.

With regard to Invention Example 2, such a mixed powder for sintering as stated above was uniformly spread on a steel plate having a thickness of 1.3 mm and provided with a copper plating of 3 μm thickness, and the thus prepared combination of materials was subjected to a first sintering, rolling, and a second sintering followed by a final rolling to obtain a composite sliding material as a bimetal.

The thus produced composite sliding materials were machined to produce plain bearings each having a thickness of 1.5 mm, and the plain bearings were subjected to a seizure test and a wear test. Half shell bearings having a thickness of 1.5 mm were also produced and subjected to a fatigue test. Further, in order to confirm the tensile strength of the sintered copper alloy layer of the respective composite sliding material, the steel plate (back steel) was removed from the material and a tensile test was conducted. A shear test was also conducted in order to confirm the bonding strength between the sintered copper alloy layer and the steel back plate of the respective composite sliding materials.

In the seizure test, the mating member driven to rotate by a motor was forced to slide on the respective plain bearing in such a manner that the testing load was increased step-by-step from an initial bearing load wherein 3 N/mm² was accumulated at every increase of load while the load at each step was held for 30 minutes. When the temperature of backside surface of the plain bearing exceeds 200° C. or the driving current of the motor driving the mating member exceeds a predetermined value, the bearing load at that time was determined to be a seizure specific load.

In the wear test, the mating member driven by a motor was caused to slide on the respective plain bearing under a constant load, and the wear amount was measured after a test period of time.

In the fatigue test, a constant load was exerted on the respective half shell bearing and, after the test, the bearing alloy was observed whether fatigue was occurred. The conditions for the wear and fatigue tests are shown in following Tables 3 and 4.

TABLE 1

| | | Chemical composition of copper-base sintered alloy | | | | | Volume of Bi/ Volume of solid lubri-cant | Cu Plat-ing | Final roll-ing | Seizure | | | | |
|---|---|---|---|---|---|---|---|---|---|---|---|---|---|---|
| | No | Cu mass % | Sn mass % | Bi mass % | P mass % | Others mass % | Solid lubri-cant (vol %) | | | | Bonding shear strength (N/mm²) | Tensile strength (N/mm²) | spe-cific load (MPa) | Wear amount (μm) | Occur-rence of Fatigue |
| Invention Example | 1 | Bal. | 10 | 5 | — | — | Gr:5 | 0.9 | No | Yes | 162 | 255 | 24 | 8 | No |
| | 2 | Bal. | 10 | 5 | 0.2 | — | Gr:5 | 0.9 | Yes 3 μm | Yes | 171 | 286 | 21 | 6 | No |
| | 3 | Bal. | 10 | 5 | — | — | Gr:8 | 0.5 | No | Yes | 148 | 225 | 27 | 6 | No |
| | 4 | Bal. | 10 | 13 | — | — | Gr:6 | 1.9 | No | Yes | 121 | 236 | 30 | 9 | No |
| | 5 | Bal. | 10 | 13 | — | — | Gr:18 | 0.6 | No | Yes | 101 | 208 | 30 | 6 | No |
| | 6 | Bal. | 10 | 2 | — | — | Gr:2 | 0.9 | No | Yes | 178 | 312 | 18 | 14 | No |
| | 7 | Bal. | 2 | 5 | — | — | Gr:5 | 0.9 | No | Yes | 134 | 204 | 24 | 16 | No |

TABLE 1-continued

| | No | Chemical composition of copper-base sintered alloy | | | | | | Volume of Bi/ Volume of solid lubricant | Cu Plating | Final rolling | Seizure | | | | |
|---|---|---|---|---|---|---|---|---|---|---|---|---|---|---|---|
| | | Cu mass % | Sn mass % | Bi mass % | P mass % | Others mass % | Solid lubricant (vol %) | | | | Bonding shear strength (N/mm$^2$) | Tensile strength (N/mm$^2$) | specific load (MPa) | Wear amount ($\mu$m) | Occurrence of Fatigue |
| | 8 | Bal. | 10 | 5 | — | — | BN:5 | 0.9 | No | Yes | 164 | 260 | 21 | 10 | No |
| | 9 | Bal. | 10 | 5 | — | — | Gr:5 | 0.9 | No | No | 132 | 206 | 24 | 18 | No |
| | 10 | Bal. | 10 | 5 | — | Co:5 | Gr:5 | 0.9 | No | Yes | 162 | 273 | 24 | 6 | No |
| | 11 | Bal. | 10 | 5 | — | — | Gr:5 | 0.9 | Yes 3 $\mu$m | Yes | 173 | 253 | 24 | 8 | No |
| Comparative Example | 1 | Bal. | 0.5 | 5 | — | — | Gr:5 | 0.9 | No | Yes | 101 | 187 | 24 | 20 | Yes |
| | 2 | Bal. | 10 | 1 | — | — | Gr:12 | 0.7 | No | Yes | 156 | 326 | 12 | 24 | No |
| | 3 | Bal. | 10 | 18 | — | — | Gr:23 | 0.7 | No | Yes | 87 | 168 | 30 | 10 | Yes |
| | 4 | Bal. | 10 | 5 | — | — | Gr:15 | 0.3 | No | Yes | 122 | 188 | 27 | 8 | Yes |
| | 5 | Bal. | 10 | 8 | — | — | Gr:3 | 2.3 | No | Yes | 138 | 254 | 15 | 20 | No |
| | 6 | Bal. | 10 | — | — | Pb:6 | Gr:5 | — | No | Yes | 165 | 263 | 24 | 12 | No |
| | 7 | Bal. | 10 | — | — | Pb:10 | — | — | No | Yes | 175 | 260 | 24 | 8 | No |

TABLE 2

(Conditions of seizure test)

| ITEM | CONDITIONS |
|---|---|
| Peripheral speed | 2.0 m/sec |
| Lubricating oil | SAE#30 |
| Amount of feeding oil | 20 ml/minute |
| Material of mating member | JIS S55C as quenched |
| Roughness of mating member | $R_{max}$: not more than 1.0 $\mu$m |

TABLE 3

(Conditions of wear test)

| ITEM | CONDITIONS |
|---|---|
| Peripheral speed | 0.01 m/sec |
| Specific load | 10 MPa |
| Lubricating oil | SAE#10 |
| Feeding oil | in oil bath |
| Test period of time | 4 hours |
| Material of mating member | JIS S55C as quenched |
| Roughness of mating member | $R_{max}$: not more than 1.0 $\mu$m |

TABLE 4

(Conditions of fatigue test)

| ITEM | CONDITIONS |
|---|---|
| Specific load | 110 MPa |
| Test period of time | 20 hours |
| Speed | 9 m/sec |
| Lubricating oil | SAE#30 |
| Feeding oil pressure | 0.49 MPa |
| Test temperature | 100° C. |
| Material of mating member | JIS S55C as quenched |
| Roughness of mating member | $R_{max}$: not more than 1.0 $\mu$m |

The following is an analysis of the test results.

General Evaluation

Comparative Example 7 corresponds to a conventional lead bronze alloy. Invention Examples 1 to 10 exhibit excellent properties of anti-seizure, wear resistance, and fatigue resistance equal to or superior to Comparative Example 7. Therefore, it can be understood that the additive Bi and solid lubricant contributes to the copper system composite sliding material of the Invention Examples without Pb to have excellent sliding properties equal to or superior to the sintered Cu—Sn—Pb system alloy.

Effect of Sn

Invention Example 1 has substantially the same chemical composition as Comparative Example 1 except for the Sn content different to each other. Comparative Example 1 containing a smaller amount of Sn has low tensile strength and inferior fatigue resistance. From this, it can be understood that high strength and excellent fatigue resistance cannot be attained if the Sn content is smaller.

Effect of Bi and Solid Lubricant (1) Content

Bi and the solid lubricant influence wear resistance and fatigue resistance of the copper alloy. Comparing Invention Example 1 with Comparative Example 2, the latter having smaller contents of Bi and the solid lubricant is inferior to Invention Example 1 in anti-seizure property and wear resistance. Further, comparing Invention Example 1 with Comparative Example 3, the latter having larger contents of Bi and the solid lubricant is inferior to Invention Example 1 in wear resistance and fatigue resistance. As can be seen from the above, larger or smaller contents of Bi and the solid lubricant deteriorate the copper alloy in anti-seizure property, wear resistance and fatigue resistance.

(2) Volume Ratio

Comparing Invention Example 1 with Comparative Example 4, the latter having a smaller volume ratio of Bi to the solid lubricant (Volume of Bi/Volume of the solid lubricant) has low tensile strength and inferior fatigue resistance. Further, comparing Invention Example 1 with Comparative Example 5, the latter having a larger volume ratio of Bi to the solid lubricant is equal to the former in tensile strength and fatigue resistance but inferior to the former in anti-seizure property and wear resistance.

Figure 2:
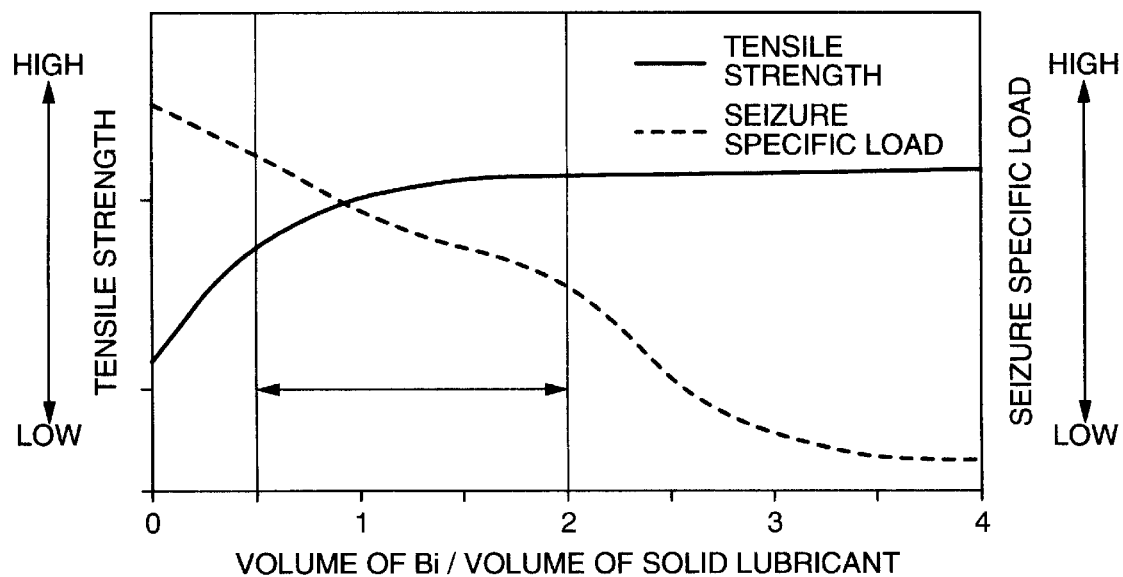
FIG. 2 is a graph showing the relationship between the volume ratio of Bi to the solid lubricant and the tensile strength and the seizure specific load of the sintered copper alloy.

As can be seen from the above, the volume ratio of Bi to the solid lubricant influences tensile strength, anti-seizure property, wear resistance, and fatigue resistance of the copper alloy. FIG. 2 shows results of the tensile test and the seizure test carried out with various volume ratios of Bi to the solid lubricant in the copper alloy adjusted to contain 10 mass % of Sn and 10 volume % in total of Bi and the solid lubricant. It can be seen from the drawing that the tensile strength is inferior when the volume ratio is less than 0.5 and the anti-seizure property is remarkably deteriorated when the volume ratio exceeds 2. Therefore, the volume ratio of Bi to the solid lubricant is preferably in a range of 0.5 to 2.0.

(3) Function of Bi and Solid Lubricant

As stated above, the contents of Bi and the solid lubricant and the volume ratio therebetween influence sliding properties of the copper alloy. Since Bi is a low melting point metal like as Pb, it becomes liquid when sintering and enters into interfacial regions of particles of the copper alloy powder to promote sintering of the copper alloy powder. At that time, liquidus Bi is absorbed in the solid lubricant, whereby Bi is prevented to flow out from the sintering powder resulting in that Bi effectively contributes to bonding of particles of the copper alloy powder. A good sintering property is attained by the above action of Bi and the solid lubricant. It is also noted that, even in the case of the Cu—Sn—Bi system alloy, Bi melts and flows out from the alloy and enter into interfacial regions of particles of the copper alloy powder during sintering.

FIG. 1 schematically shows the metal structure of embodiments of the invention copper alloy, in which the Bi phase is present at grain boundaries of the Cu matrix. Further, there can be seen the structural feature of the invention sintered copper alloy in FIG. 1, according to which the solid lubricant is entrained in the Bi phase. In the case where the volume ratio of Bi to the solid lubricant is determined to be in a range of 0.5 to 2.0, there can be obtained such a metal structure that the solid lubricant is entrained in the Bi phase. For obtaining the metal structure, most preferably the volume ratio of Bi to the solid lubricant is around 1.

The solid lubricant improves anti-seizure property of the copper alloy by virtue of its inherent characteristics. However, if the solid lubricant is present separately among particles of a copper alloy powder, it acts as if there are mere vacancies in the copper alloy powder resulting in deteriorated strength of the copper alloy, and easily leaves from existing positions among alloy particles during slide-contacting with a mating member.

However, according to the present invention, since the solid lubricant is entrained in the Bi phase as stated above, it is possible to prevent deterioration of the copper alloy in strength, and the solid lubricant does not easily leave from existing positions among alloy particles during slide-contacting with a mating member. According to the present invention, by virtue of the same reason mentioned above, there can be also obtained advantages that the solid lubricant prevents Bi to excessively flow toward the sliding surface of the copper alloy under an elevated high temperature due to a sliding movement relative to the mating member resulting in excellent wear resistance. Thus, the invention sintered copper alloy exhibits excellent performance by virtue of the above mutual relationship between Bi and the solid lubricant.

Bi also contributes to improvement of wear resistance of the copper alloy. Comparing Invention Example 1 with Comparative Example 6 which contains Pb instead of Bi, the latter exhibits a larger wear amount than the former. From this, it can be confirmed that Bi contributes to improvement of wear resistance of the copper alloy as compared with Pb.

Copper Plating

When a copper plating exists between the steel plate and the sintered copper alloy layer, as will be apparent from the comparison between Invention Example 11 with the copper plating layer and Invention Example 1 with no copper plating layer, the former has greater bonding shear strength than the latter.

P and Co

P and Co contribute to improvement of tensile strength of the copper alloy, respectively. Invention Example 2 containing P and Invention Example 10 containing Co show a greater tensile strength than Invention Example 1 containing none of P and Co.

Further, comparing Invention Example 1 subjected to final rolling and Invention Example 9 not subjected to final rolling with regard to the tensile strength, the former shows a greater tensile strength than the latter, so that it is also expectable to improve tensile strength with work-hardening caused by final rolling.

As will be apparent from the above, according to the invention, the copper system composite sliding material without Pb can be provided, which has excellent sliding properties equal to or superior to those of the lead-bronze system sintered copper alloy and is excellent in mechanical strength.

What is claimed is:

1. A composite sliding material comprising a steel plate and a sintered copper alloy layer which is bonded to the steel plate, wherein the copper alloy comprises 1.5 to 15 mass % of Sn, 1.5 to 15 mass % of Bi, 1.5 to 20 volume % of a solid lubricant, and balance of Cu and incidental impurities, and wherein a volume ratio of Bi to the solid lubricant is in a range of 0.5 to 2.0.

2. A composite sliding material according to claim 1, wherein the solid lubricant is one or more substances selected from the group consisting of graphite, BN, $MoS_2$ and $WS_2$.

3. A composite sliding material according to claim 1, wherein the copper alloy further comprises not more than 40 mass % in total of one or more elements selected from the group consisting of Fe, Al, Zn, Mn, Co, Ni and Si.

4. A composite sliding material according to claim 2, wherein the copper alloy further comprises not more than 40 mass % in total of one or more elements selected from the group consisting of Fe, Al, Zn, Mn, Co, Ni and Si.

5. A composite sliding material according to claim 1, wherein a copper plating layer, having a thickness of not less than 2 $\mu$m, exists between the steel plate and the sintered copper alloy layer.

6. A composite sliding material according to claim 4, wherein a copper plating layer, having a thickness of not less than 2 $\mu$m, exists between the steel plate and the sintered copper alloy layer.

7. A composite sliding material according to claim 1, wherein the sintered copper alloy layer has a tensile strength of not less than 200 $N/mm^2$.

8. A composite sliding material according to claim 4, wherein the sintered copper alloy layer has a tensile strength of not less than 200 $N/mm^2$.

9. A composite sliding material according to claim 5, wherein the sintered copper alloy layer has a tensile strength of not less than 200 $N/mm^2$.

10. A composite sliding material according to claim 6, wherein the sintered copper alloy layer has a tensile strength of not less than 200 $N/mm^2$.

11. A composite sliding material comprising a steel plate and a sintered copper alloy layer which is bonded to the steel plate, wherein the copper alloy comprises 1.5 to 15 mass % of Sn, 0.03 to 1 mass % of P, 1.5 to 15 mass % of Bi, 1.5 to 20 volume % of a solid lubricant, and balance of Cu and incidental impurities, and wherein a volume ratio of Bi to the solid lubricant is in a range of 0.5 to 2.0.

12. A composite sliding material according to claim 11, wherein the solid lubricant is one or more substances selected from the group consisting of graphite, BN, $MoS_2$ and $WS_2$.

13. A composite sliding material according to claim 11, wherein the copper alloy further comprises not more than 40 mass % in total of one or more elements selected from the group consisting of Fe, Al, Zn, Mn, Co, Ni and Si.

14. A composite sliding material according to claim 12, wherein the copper alloy further comprises not more than 40 mass % in total of one or more elements selected from the group consisting of Fe, Al, Zn, Mn, Co, Ni and Si.

15. A composite sliding material according to claim 11, wherein a copper plating layer, having a thickness of not less than 2 µm, exists between the steel plate and the sintered copper alloy layer.

16. A composite sliding material according to claim 14, wherein a copper plating layer, having a thickness of not less than 2 µm, exists between the steel plate and the sintered copper alloy layer.

17. A composite sliding material according to claim 11, wherein the sintered copper alloy layer has a tensile strength of not less than 200 N/mm$^2$.

18. A composite sliding material according to claim 14, wherein the sintered copper alloy layer has a tensile strength of not less than 200 N/mm$^2$.

19. A composite sliding material according to claim 15, wherein the sintered copper alloy layer has a tensile strength of not less than 200 N/mm$^2$.

20. A composite sliding material according to claim 16, wherein the sintered copper alloy layer has a tensile strength of not less than 200 N/mm$^2$.

* * * * *